United States Patent [11] 3,630,840

[72] Inventors Otto Wagner
Wuppertal-Elberfeld;
Horst Geilhausen, Opladen; Hans
Bahnemann; Otto-Erich Schweckendiek,
both of Cologne, all of Germany
[21] Appl. No. 19,515
[22] Filed Mar. 13, 1970
[45] Patented Dec. 28, 1971
[73] Assignee Farbenfabriken Bayer Aktiengesellschaft
Leverkusen, Germany
[32] Priority Mar. 15, 1969
[33] Germany
[31] P 19 13 272.0

[54] PROCESS FOR PURIFYING SOLUTIONS OF THE
FOOT-AND-MOUTH DISEASE VIRUS
4 Claims, No Drawings
[52] U.S. Cl. ................................................ 195/1.5,
260/112, 424/88, 424/89, 424/177

[51] Int. Cl. ...................................................... C12k 5/10,
C12k 7/00
[50] Field of Search ........................................... 195/1.5;
260/112; 424/88, 89, 177

[56] References Cited
UNITED STATES PATENTS
3,415,804 12/1968 Polson .......................... 260/112

Primary Examiner—Shep K. Rose
Attorney—McCarthy, Depaoli & O'Brien

ABSTRACT: Foot-and-mouth disease virus solutions, used for the preparation of vaccines against the disease, are freed of undesirable protein contaminants accompanying the virus particles by subjecting the impure solution to fractional precipitation with polyethylene glycol solutions. The precipitate, containing the virus intigens is separated from the liquid phase which contains the proteins, preferably by centrifuging. The sediment consists of substantially purified virus antigen.

PROCESS FOR PURIFYING SOLUTIONS OF THE FOOT-AND-MOUTH DISEASE VIRUS

BACKGROUND OF THE INVENTION

1. Field of the Invention

The present invention pertains to the production of vaccines against foot-and-mouth disease, a commonly known acute contagious febrile disease affecting cattle. More specifically the invention is directed to the preparation of purified solutions of the foot-and-mouth virus used to prepare the vaccines.

2. Description of the Prior Art

To produce vaccines against foot-and-mouth disease (IMD), suitable cell cultures are infected with the FMD virus. The cells are destroyed in the process and the liberated cell proteins and virus particles pass into the supernatant solution. Since the supernatant solution has hitherto been worked up into vaccines without prior treatment, the aforesaid proteins finally pass into the vaccines. As a result, allergic reactions frequently occur in animals treated with such vaccines.

Another disadvantage of the previous process consists in that the supernatant solution containing the said proteins is storable only at certain temperatures and for a limited time and that high losses of virus solutions have therefore to be accepted.

For this reason, attempts were made to find ways of purifying the FMD virus solutions before they were worked up into vaccines, that is to say to remove the undesirable proteins as thoroughly as possible.

SUMMARY OF THE INVENTION

The subject matter of the invention is a process for purifying solutions of the FMD virus, which consists in subjecting the impure FMD virus solutions, i.e. those containing the undesirable proteins, to fractional precipitation with polyethylene glycol solutions.

This fractional precipitation according to the invention yields a precipitate which consists of virus antigen and a little polyethylene glycol. The undesirable proteins, surprisingly, remain in the solution. The precipitate thus obtained is separated from the liquid phase, preferably by centrifuging. A sediment is obtained, which consists of substantially purified virus antigen. This can be stored and/or worked up into vaccine in the usual way.

Polyethylene glycols suitable for carrying out the process according to the invention are those with molecular weights from 600 to 20,000, preferably 1,000 to 2,000. These polyethylene glycols are used in aqueous solutions.

Suitable concentrations of these aqueous solutions lie between 10 and 70 percent, preferably at 50 percent.

The process according to the invention is carried out at a pH value from 7 to 9, preferably at 8.5, and at temperatures between 0° C. and room temperature, the optimum being about 4° to 5° C.

It proves to be advantageous to allow the mixture to stand for 12 to 60 hours after the addition of the polyethylene glycol solution.

It is also expedient to adjust the final concentration of polyethylene glycol in the mixture to 15 to 35 percent, preferably 25 percent, polyethylene glycol.

The process according to the invention can be applied to infectious as well as to noninfectious FMD virus solutions. It also offers the possibility of storing the product in a highly concentrated and, after freeze-drying, even in solid form.

If virus solutions which have been purified according to the process of the invention are worked up into vaccines, the effectiveness of the products obtained corresponds to that of the commercial products.

Moreover, the products obtained according to the invention are almost free from accompanying proteins so that their application does not lead to incidents of allergy.

In addition, the substantial purity of the products prepared according to the invention enables them to be obtained in crystalline form.

DESCRIPTION OF THE PREFERRED EMBODIMENTS

Example 1

One thousand milliliters of a 50 percent mixture of polyethylene glycol and water are added at pH 8.5 to 1 liter of the FMD virus solution and the material is thoroughly mixed. The mixture thus obtained is allowed to stand at +4° C. for 24 hours. The sediment formed during the time of standing (fraction I) is centrifuged in a cooled centrifuge at 6,000 r.p.m. for 60 minutes. The precipitate so obtained is taken up with 10 ml. of a physiological sodium chloride solution and immediately cooled to −80° C., or it is taken up with 10 ml. of water and lyophilised.

Example 2

One thousand two hundred milliliters of a 50 percent mixture of polyethylene glycol and water are added at pH 8.3 to 1,000 ml. of the FMD virus solution and the material is thoroughly mixed. The solution is subsequently allowed to stand at +4° C. for 12 hours. The procedure of example 1 is then followed.

Example 3

Seven hundred fifty milliliters of a mixture of polyethylene glycol and water are added at pH 8.0 to 1,000 ml. of the FMD virus solution and the material is thoroughly mixed. The mixture is allowed to stand at +4° C. for 36 hours. The procedure of example 1 is subsequently followed.

The highly concentrated fractions obtained according to examples 1 to 3 are worked up as follows, in order to determine the serological and immunological activity.

Example A

Forty-two milliliters of highly concentrated protein prepared from 1 liter of FMD virus solution are stored at −80° C. After defreezing to +4° C, the concentrate is subjected to an ultrasonic treatment for 1/2 to 2 minutes and thus homogenized. The homogenized product is centrifuged in a cooled centrifuge at 3,000 to 4,000 r.p.m. for 15 minutes to 1 hour. The clear supernatant solution is serologically tested for purity of type with the aid of the complete fixation reaction.

Example B

Four hundred milligrams of lyophilised protein of the fraction I obtained from 1 liter of FMD virus solution, are taken up with 20 ml. of a buffered isotonic NaCl solution and further treated as described in example A.

After working up as described above and after serological examination, a test vaccine is prepared in the following way:

After being worked up, the precipitate is rediluted to the starting volume, for example, to 1 liter, by means of an isotonic buffered sodium chloride solution. 250 ml. of this solution are mixed with 220 ml. of a 3 percent aluminum hydroxide suspension and the mixture is made up to 1 liter with more isotonic sodium chloride solution. If the infectious virus was used as starting material, the solution is inactivated in the usual way, for example, with formaldehyde; otherwise it is shaken at room temperature for 30 minutes and is then ready for use. It is tested on guinea pigs and if the result of this test is favorable, used for inoculation of cattle.

What is claimed is:

1. The process for the purification of solutions of the foot-and-mouth virus obtained from cultures thereof, which comprises mixing said solution at a pH of from 7 to 9 with an aqueous 10–70 percent solution of polyethylene glycol having a molecular weight from 600 to 20,000 thereby causing a fractional precipitation of the virus antigen and separating the precipitate from the liquid phase containing undesirable proteins causing allergic reactions in animals, to obtain a substantially purified foot-and-mouth virus antigen.

2. The process of claim 1 carried out at a temperature between 0° C. and room temperature.

3. The process of claim 1 carried out at a pH of about 8.5 and a temperature of from 4° to 5° C.

4. The process of claim 1 wherein after addition of the polyethylene glycol solution the mixture is permitted to stand for 12 to 60 hours, then separating the precipitate by centrifuge.

* * * * *

UNITED STATES PATENT OFFICE
CERTIFICATE OF CORRECTION

Patent No. 3,630,840          Dated December 28, 1971

Inventor(s) Otto Wagner et al

It is certified that error appears in the above-identified patent and that said Letters Patent are hereby corrected as shown below:

Column 1, line 14, "(IMD)" should be -- (FMD) --.

Signed and sealed this 13th day of June 1972.

(SEAL)
Attest:

EDWARD M. FLETCHER, JR.
Attesting Officer

ROBERT GOTTSCHALK
Commissioner of Patents